United States Patent
Rall et al.

(10) Patent No.: US 12,516,593 B2
(45) Date of Patent: Jan. 6, 2026

(54) SYSTEMS AND METHODS FOR SUBDIVIDING CHEMICAL FLOW FOR WELL COMPLETION OPERATIONS

(71) Applicants: Jason Rall, Frisco, TX (US); Zachary West, Broussard, LA (US); Jacob Deshotels, Lafayette, LA (US)

(72) Inventors: Jason Rall, Frisco, TX (US); Zachary West, Broussard, LA (US); Jacob Deshotels, Lafayette, LA (US)

(73) Assignee: DOWNHOLE CHEMICAL SOLUTIONS, LLC, Frisco, TX (US)

( * ) Notice: Subject to any disclaimer, the term of this patent is extended or adjusted under 35 U.S.C. 154(b) by 730 days.

(21) Appl. No.: 17/589,398

(22) Filed: Jan. 31, 2022

(65) Prior Publication Data

US 2022/0243573 A1    Aug. 4, 2022

Related U.S. Application Data

(60) Provisional application No. 63/143,573, filed on Jan. 29, 2021.

(51) Int. Cl.
| | | |
|---|---|---|
| *E21B 43/26* | (2006.01) | |
| *B01F 35/71* | (2022.01) | |
| *E21B 43/17* | (2006.01) | |
| *E21B 43/24* | (2006.01) | |

(52) U.S. Cl.
CPC ........ *E21B 43/2607* (2020.05); *B01F 35/712* (2022.01); *B01F 35/7176* (2022.01); *E21B 43/2405* (2013.01); *E21B 43/17* (2013.01)

(58) Field of Classification Search
CPC .. E21B 43/2607; E21B 43/2405; E21B 43/17; E21B 2200/20; E21B 43/26; B01F 35/712; B01F 35/7176
USPC ............................................ 366/150.1–182.4
See application file for complete search history.

(56) References Cited

U.S. PATENT DOCUMENTS

| | | | | |
|---|---|---|---|---|
| 4,168,295 | A | * | 9/1979 | Sawyer .................... C22B 11/08 422/111 |
| 4,186,772 | A | | 2/1980 | Handleman |
| 4,603,156 | A | | 7/1986 | Sortwell |
| 4,884,925 | A | | 12/1989 | Kemp et al. |
| 4,964,732 | A | * | 10/1990 | Cadeo .................... B01F 35/833 366/159.1 |
| 5,213,414 | A | | 5/1993 | Richard et al. |
| 5,328,261 | A | | 7/1994 | Castano |
| 5,642,939 | A | * | 7/1997 | Comardo .............. B01F 35/181 366/132 |
| 5,803,596 | A | * | 9/1998 | Stephens .................. A62C 5/02 261/DIG. 26 |

(Continued)

*Primary Examiner* — Charles Cooley
(74) *Attorney, Agent, or Firm* — McCutcheon Joseph, PLLC

(57) ABSTRACT

A system and method for permitting a chemical fluid line to serve multiple downstream injection sites from a single upstream pump. One or more redundant primary chemical conduits are manifolded via a flexible joint into a plurality of sub-stream chemical conduits, each of the sub-stream chemical conduits comprising a sub-stream flow meter and an independently controlled motorized flow control valve. control computer directs each respective control valve to open and close depending on the desired flow rate of the respective downstream injection site.

6 Claims, 2 Drawing Sheets

(56) References Cited

U.S. PATENT DOCUMENTS

| | | | |
|---|---|---|---|
| 5,887,974 A * | 3/1999 | Pozniak | B01F 25/46 366/136 |
| 6,247,838 B1 * | 6/2001 | Pozniak | B01F 23/405 366/136 |
| 6,346,198 B1 * | 2/2002 | Watson | B01F 35/714 436/55 |
| 6,494,608 B1 * | 12/2002 | Retamal | B01F 35/82 366/132 |
| 7,377,685 B2 * | 5/2008 | Breithaupt | B01F 23/49 366/152.2 |
| 7,419,296 B2 * | 9/2008 | Allen | B01F 25/433 366/182.2 |
| 7,810,988 B2 * | 10/2010 | Kamimura | B01F 23/49 366/160.2 |
| 8,322,911 B2 | 12/2012 | Pich et al. | |
| 8,851,179 B2 * | 10/2014 | DeFosse | E21B 21/062 166/177.5 |
| 8,905,627 B2 | 12/2014 | Noles, Jr. | |
| 9,067,182 B2 | 6/2015 | Nichols et al. | |
| 9,132,395 B2 | 9/2015 | Schauerte et al. | |
| 9,447,313 B2 * | 9/2016 | Weinstein | B01F 23/59 |
| 9,643,135 B1 * | 5/2017 | Mazzei | B01F 35/1452 |
| 9,782,732 B2 | 10/2017 | Noles, Jr. | |
| 10,179,743 B2 * | 1/2019 | Shimpo | C02F 1/686 |
| 10,737,226 B2 | 8/2020 | Trahan et al. | |
| 11,148,106 B2 * | 10/2021 | Liu | B01F 35/7544 |
| 11,752,472 B2 * | 9/2023 | Miller | B01F 23/49 137/7 |
| 2002/0057625 A1 * | 5/2002 | Russell | A61M 1/1686 366/144 |
| 2002/0085447 A1 * | 7/2002 | Snyder | B01F 35/82 366/136 |
| 2003/0227821 A1 * | 12/2003 | Bae | B01F 23/49 366/163.2 |
| 2004/0249105 A1 * | 12/2004 | Nolte | B01F 25/46 366/136 |
| 2004/0256106 A1 | 12/2004 | Phillippi et al. | |
| 2007/0070803 A1 * | 3/2007 | Urquhart | B01F 35/2132 366/152.4 |
| 2008/0006154 A1 * | 1/2008 | Johansson | B01F 23/232 95/149 |
| 2008/0279038 A1 * | 11/2008 | Bellafiore | G05D 21/02 366/152.4 |
| 2009/0188565 A1 * | 7/2009 | Satake | B01F 35/2211 700/285 |
| 2010/0031825 A1 * | 2/2010 | Kemp | B01F 23/49 366/152.2 |
| 2022/0243573 A1 * | 8/2022 | Rall | B01F 35/712 |
| 2022/0401899 A1 * | 12/2022 | Miller | G05D 11/132 |

\* cited by examiner

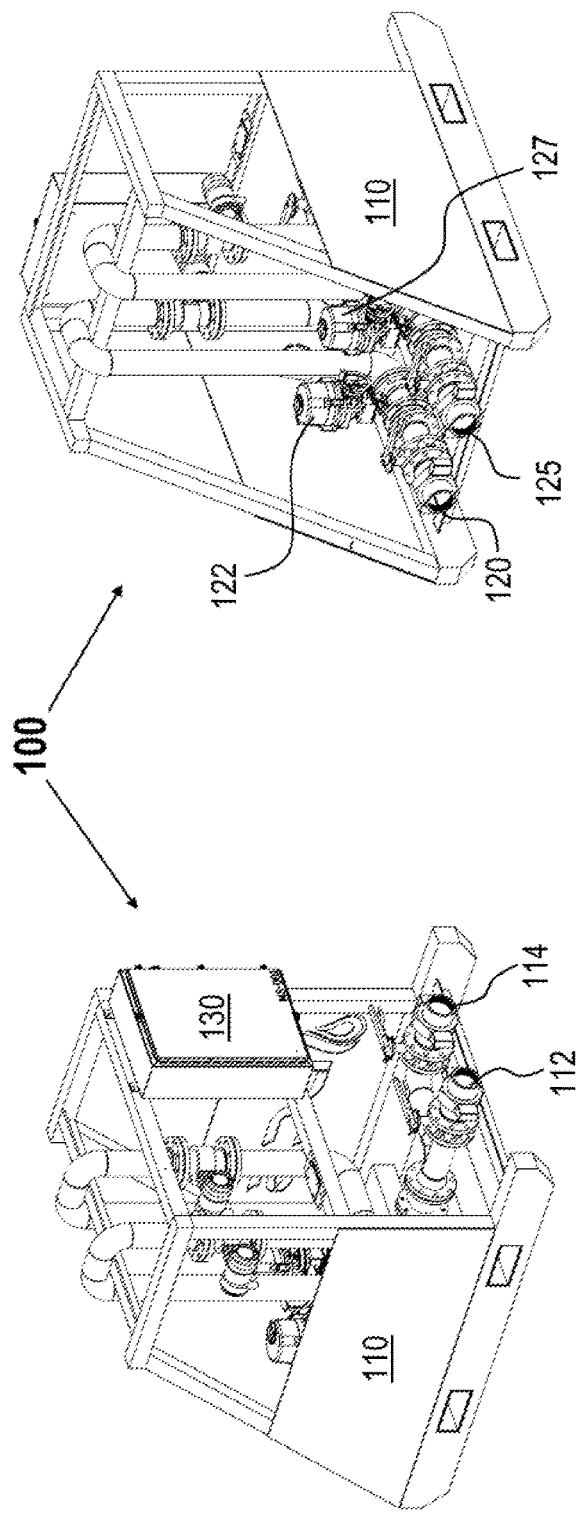
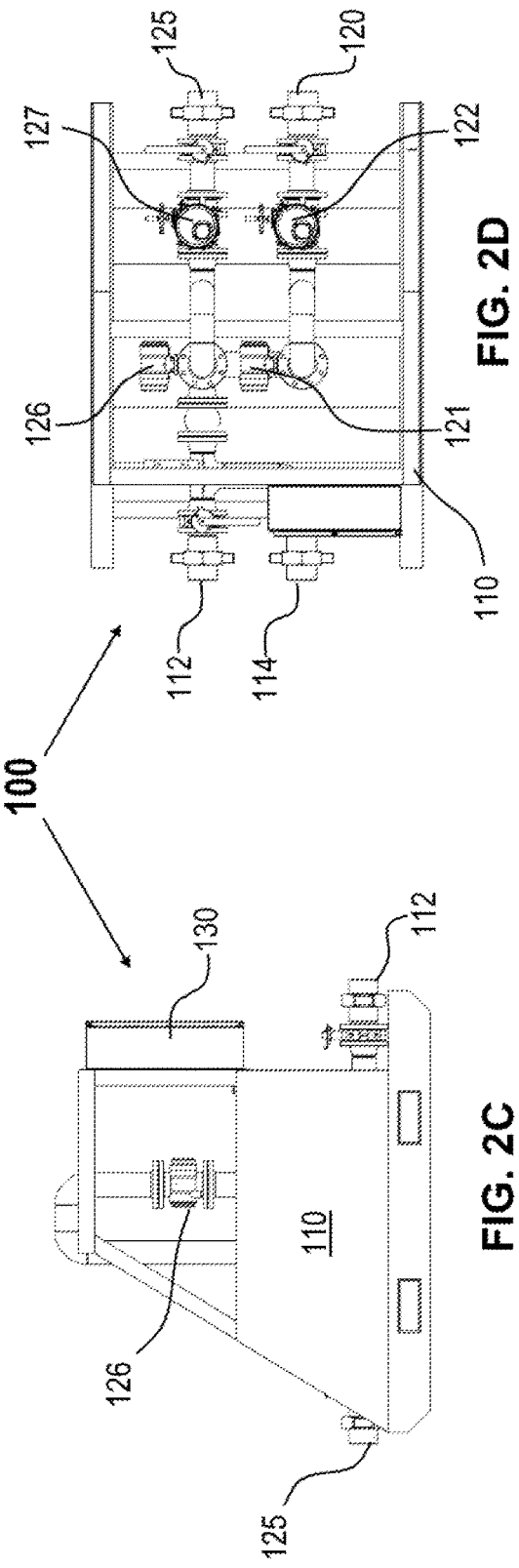
FIG. 2A
FIG. 2B
FIG. 2C
FIG. 2D

SYSTEMS AND METHODS FOR SUBDIVIDING CHEMICAL FLOW FOR WELL COMPLETION OPERATIONS

REFERENCE TO RELATED APPLICATIONS

This is a non-provisional US patent application claiming priority to provisional U.S. patent application Ser. No. 63/143,573, filed on 29 Jan. 2021, having the title "Systems and Methods for Subdividing Chemical Flow For Well Fracture Applications." The contents of the above-referenced application are incorporated herein by reference.

FIELD

Embodiments usable within the scope of the present disclosure relate, generally, to systems and methods usable to provide multiple streams of aqueous polymer fluids to two or more well fracture or coil tubing operations, and more specifically, to systems and methods usable to provide aqueous polymer fluid to an operation in a state that is ready for use (e.g., fully hydrated and at proper polymer concentration, or at a sufficient chemical activity).

BACKGROUND

To stimulate and/or increase the production of oil and gas from a well, a process known as fracturing (colloquially referred to as "fracking") is performed. In brief summary, a pressurized fluid—often water, though other fluids can also be used—is pumped into a producing region of a formation at a pressure sufficient to create fractures in the formation, thereby enabling hydrocarbons to flow from the formation with less impedance. Solid matter, such as sand, ceramic beads, and/or similar particulate-type materials, can be mixed with the fracturing fluid, this material generally remaining within the fractures after the fractures are formed. The solid material, known as proppant, serves to prevent the fractures from closing and/or significantly reducing in size following the fracturing operation, e.g., by "propping" the fractures in an open position. Following the fracturing operation, coiled tubing is lowered into the wellbore to drill and/or otherwise remove plugs applied during the fracturing operation and/or flush other materials from the wellbore.

It is normally desirable to add a polymeric fluid friction reducer, such as a polyacrylamide or other types of polymers, into the well fracture of coil tubing injection water. The use of a polymer reduces the fluid friction and can aid in increasing the viscosity of the water, improving the transport of solid proppants to the downhole injection point. Use of such polymers can reduce the effects of internal friction within the fluid, thereby decreasing the hydraulic power required to rapidly pump the fluid into the downhole formation, and in some cases, can reduce pressure losses caused by internal friction by as much as 75%. Similarly, when performing coiled tubing operations, polymeric friction reducers are used to facilitate installation and operation of coiled tubing and reduce internal friction in the fluids used for such operations.

Typically, a suitable polymer is transported to an operational site in an emulsified state, in which the polymer is in a water-in-oil emulsified form or where a dry polymer is suspended in mineral oil or another similar non-aqueous liquid, along with various surfactants, with which the polymer will not significantly react or hydrate. The polymer can also be delivered to the well site in a dry form and hydrated on location with water to a concentration needed for a well fracture or coil tubing application. Once the polymer reaches an operational site, it can be passed through an on-site blending tub and the high-pressure pumps used to inject the fracturing fluid into the wellbore, such that system turbulence and shear forces mix the polymer with the (normally aqueous) fracturing fluid, partially or fully hydrating the polymer. The hydrated polymer can thereby reduce internal friction in the fracturing fluid, facilitating injection thereof during the fracturing operation.

The invention is not limited to working solely with friction reducers and/or viscosity building polymers. Wide varieties of chemical additives are commonly used in well drilling, completion, water treatment, and well fracture operations. Just as with the friction and viscosity polymers, the other chemical additives are commonly delivered to well site as lower-activity water-soluble liquid products. There are measurable and meaningful cost-savings advantages to using powdered chemical additives versus using products delivered as liquids, such as lower handling and freight costs for delivery and storage at the well site. Creating a concentrated chemical stream and subdividing the concentrated chemical stream into multiple sub-streams of chemical allow operators to direct the chemical to two or more application points with only a single primary chemical feed conduit to monitor and maintain, at the same time applying a chemical stream of proper proportion at multiple downstream locations effectively.

Another limitation of current conventional chemical application system and method involves the need to use multiple chemical blending and hydration systems to treat multiple application points. The subdivision of a single stream of chemical provides multiple point application consistency of chemical treatment using a single chemical blending and hydration system.

A need exists for systems and methods for providing multiple points of application of polymer to a fracturing operation that can enable single pump operation and the capacity to subdivide a single stream of aqueous chemical solution to multiple application points. Embodiments of the systems and methods as disclosed in the present application meet these needs.

SUMMARY OF THE INVENTION

In an embodiment, the present invention provides an improved chemical injection delivery method for subdividing a single chemical stream flowing through a single conduit into multiple streams, each with individual chemical fluid conduits, with accurate control of the rate of chemical injected in each of the individual chemical streams served by the main feed chemical stream. The method comprises a process for calculating the amount of chemical loading in the concentrated feed stream conduit and a method of calculating individual chemical dosage in each subdivided stream of chemical fluid conduits, and correspondingly restricting the flow of one or more feeds or sub-streams to achieve said chemical loadings.

In an embodiment, the invention enables continuous monitoring of the flow rate of the upstream total chemical feed line conduit and continuous monitoring of each of the downstream subdivided chemical stream conduits at or near the point of the conduit subdivision. This feature allows the operator of the chemical delivery system to adjust the chemical feed loading of the main upstream chemical feed conduit line and each of the downstream subdivided individual chemical feed conduit lines independently of each other.

In an embodiment, the invention comprises a chemical injection controller to monitor and manage the volumetric or gravimetric rate of chemical injection of each sub-stream of chemical, conveyed in conduits into the downstream process. The chemical controller calculates the optimal chemical injection rate by correcting a preset chemical injection rate based on an increase or decrease in requirements of the downstream process.

In an embodiment, the chemical injection controller is able to monitor the flow rate and pressure within the individual subdivided conduit lines for any unanticipated interruption or restriction in the flow of material, or over-pressure or under-pressure event which might create an unsafe condition, applying a corrective action by immediately adjusting or terminating the flow of the individual subdivided chemical conveying conduit.

DRAWINGS

In the detailed description of embodiments usable within the scope of the disclosure, presented below, reference is made to the accompanying drawings:

FIGS. 2A-2D depict views of a system embodiment of the present invention.

DETAILED DESCRIPTION OF THE EMBODIMENTS

Figure 1:
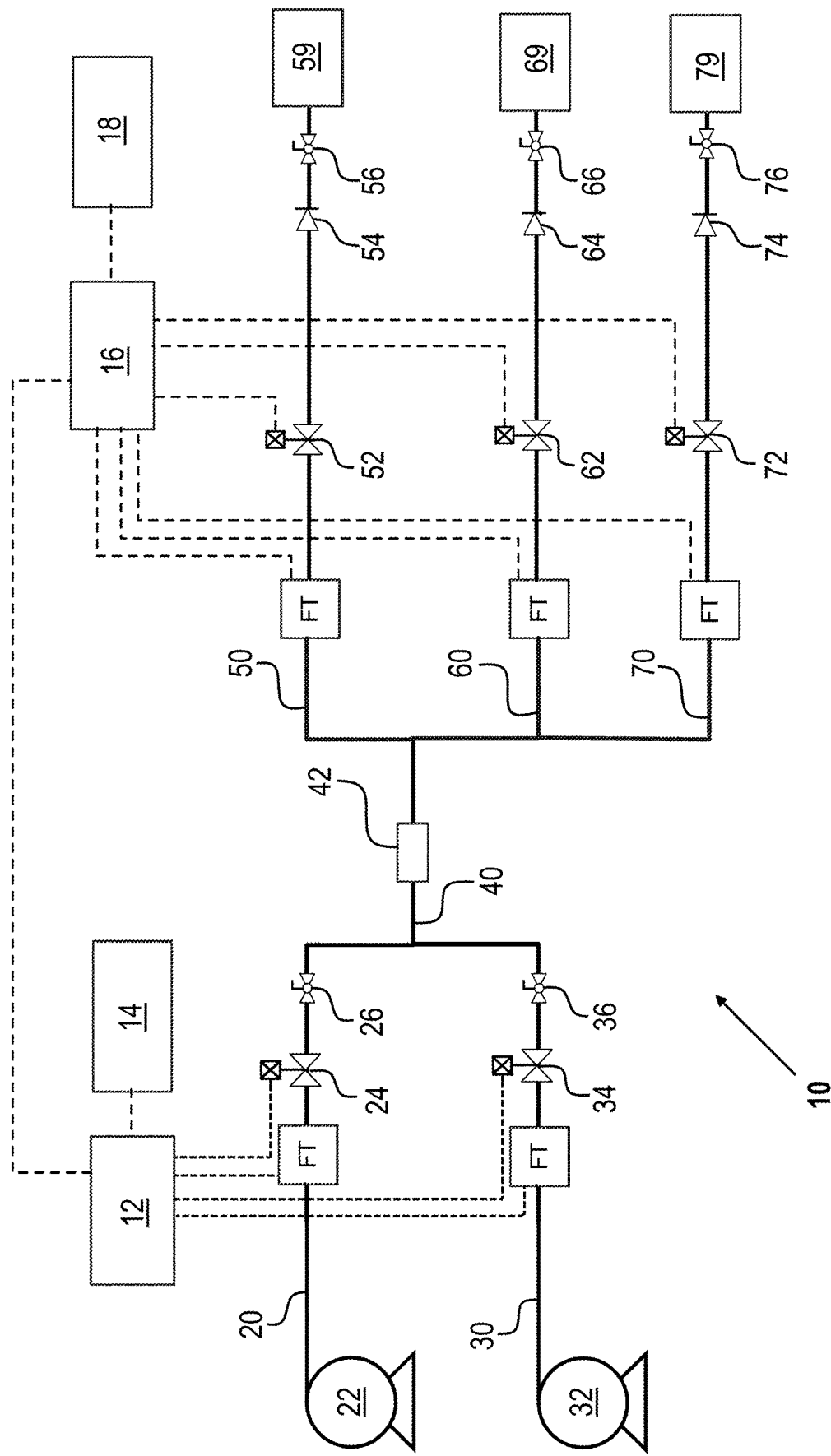
FIG. 1 depicts a generalized process flow of a method embodiment of the present invention.

Before describing selected embodiments of the present disclosure in detail, it is to be understood that the present invention is not limited to the embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended to illustrate and plainly disclose presently preferred embodiments to one of skill in the art but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Turning first to FIG. 1, an abstracted flowchart of an embodiment of the multiple flow apparatus chemical delivery system 10 is depicted. In an embodiment, a chemical is delivered to well site in metal or plastic chemical containers to supply a primary chemical feed line 20 and a secondary redundant chemical feed line 30. The primary feed line 20 and secondary redundant feed line 30 are combined into a single feed stream 40, which is equipped with a flexible joint 42 to prevent vibration from interfering with upstream and downstream processes. The primary and secondary chemical feed lines 22, 32 are controlled by a first computer controller 12 powered by a first electric power source 14 (mains, battery, etc.) which receives input from two flow transmitters in each feed line 20 and 30, and regulates flow by means of motorized control valves 24 and 34, respectively. In addition, both feed lines 20, 30 are equipped with a manual ball valve 26, 36, respectively, enabling a backup or emergency shutdown if necessary.

In the embodiment, one or more upstream chemical supply storage vessels are delivered to the operational site in bulk containers or blended into an aqueous or non-aqueous chemical fluid with a solvent and stored in onsite chemical storage at the operational site. The primary and secondary chemical feeds 20, 30 are supplied with chemical fluid using a chemical transfer or chemical injection pump 22, 32, respectively, each having a pressure capacity of greater than 5 psi. The chemical transfer method can comprise electric, hydraulic, or pneumatic energy sources.

The single combined chemical conduit 40 is subdivided into two or more individual chemical sub-stream conduits 50, 60, 70. Each chemical sub-stream conduit 50, 60, 70 is also equipped with a flow transmitter which communicates electronically via wire or wireless method to a second computer controller 16 located on the sub-stream housing or skid. In the depicted embodiment, the second computer controller 16 is powered by a second electric power source 18. In another embodiment, the second computer controller 16 can also derive operating power from the first electric power source 14. For instance, in the event of a power interruption, the second computer controller 16 could switch to surplus power from the first electric power source 14 for reasons of continuous operation and safety.

The second computer controller 16 controls individual motorized control valves 52, 62, 72 on each sub-stream conduit 50, 60, 70, respectively. Further, each of the individual sub-stream chemical conduits 50, 60, 70 are equipped with in line check valves 54, 64, 74, respectively, to prevent downstream fluids from moving upstream in a reverse flow condition. The flow check valves 54, 64, 74 also prevent pressure from the downstream application point from flowing upstream. The sub-stream system is further equipped with manual ball valves 56, 66, 76, to isolate individual components installed in the subdivided individual sub-stream chemical conduits.

An aspect of this invention is the novel and unique process having the ability to supply a chemical to multiple application points downstream (59, 69, 79). One of the advantages of the invention is the ability to deliver chemical additives to two or more chemical injection sites with a single pump upstream of the feed. The primary chemical delivery pump 22 can be supported with a second or more chemical delivery pump 32 for redundant operation to provide continuous uninterrupted chemical treatment into multiple downstream application points. The use of a primary chemical feed eliminates the need for multiple chemical storage tanks to feed supply to multiple chemical pumps. The primary chemical pump 22 along with one or more redundant secondary or greater chemical feed pumps 32 provides greater reliability for chemical injection applications.

Turning now to FIGS. 2A-2D, two perspective views, a side view, and a plan view of an exemplar system embodiment of the invention 100 are depicted. The system comprises a skid frame 110 housing a primary chemical feed 112 and a secondary, redundant chemical feed 114. Both the primary 112 and secondary 114 chemical feeds are combined into a single stream 116 via manifold, and the single stream is equipped with a flexible joint to prevent vibrational interference with upstream/downstream processes. Both primary 112 and secondary 114 chemical feeds are controlled by a single computer controller 130. The single stream 116 is then sub-divided into chemical sub-stream conduits 120 and 125.

In use, the embodiment depicted in FIGS. 2A-2D is supplied by one or more upstream chemical supply storage vessels, which deliver chemicals to the operational site in bulk containers or blended into an aqueous or non-aqueous chemical fluid with a solvent, and stored in on-site chemical storage at the operational site. The primary 112 and secondary 114 chemical feeds are supplied with chemical fluid using a single chemical transfer or chemical injection pump having a pressure capacity of greater than 5 psi. The chemical transfer method can include electric, hydraulic, or pneumatic energy sources.

Each of the individual sub-stream chemical conduits 120, 125 is equipped with a flow meter 121, 126 (respectively) which transmits flow data electronically via wire or wireless method to the computer 130 located on the skid frame 110. In an embodiment, these flow meters 121, 126 may be magnetic flow meters. In this embodiment, the computer 130 is powered by a battery, external electric power source, or may derive operating power from the primary or secondary upstream chemical feed control system. Each individual sub-stream chemical conduit 120, 125 is also equipped with a motorized flow control valve 122, 127 (respectively) which receives a signal from the computer 130 to increase or decrease the flow through the respective sub-stream conduit depending on the flow meter 121, 126. In an embodiment, the control valves 122, 127 include analog control and position feedback, such that the control valves 122, 127 can be incrementally closed or opened on a control loop, for instance, to limit the rate of change in flow rate.

Finally, each individual sub-stream chemical conduit 120, 125 is also equipped with an in-line check valve (not visible) which prevents downstream fluids from reversing flow and moving upstream. The flow check valve also prevents pressure from the downstream application point from flowing upstream. Additionally, each sub-stream system is fitted with in-line manual valves (not visible) to isolate individual components installed in the individual sub-stream chemical conduits 120, 125.

The performance of this invention provides a multiple point injection of a chemical fluid at variable flow rates and chemical dosage loading with a single chemical feed system. For example, in an embodiment, a main chemical feed flow rate may be controlled at 8 barrels per minute (336 gallons per minute) and subdivided into two streams having 4 barrels per minute (168 gallons per minute) each as two individual sub-stream flow to injection points according to a pre-determined preset within the computer controller managing the feed flow division. However, downstream conditions may create a need for greater or lesser amounts of the subdivided chemical stream. Should the first sub-stream require more chemical activity and the second sub-stream less (e.g., 6 barrels per minute (252 gallons per minute) and 2 barrels per minute (84 gallons per minute)), the computer control system would adjust the valves to change the ratio. On the other hand, if the first sub-stream requires more chemical activity and the second sub-stream's requirements are unchanged, the computer control system would adjust the total volume of the feed stream to above 8 barrels per minute (336 gallons per minute) and then re-balance the first and second sub-streams according to the new ratio.

While various embodiments usable within the scope of the present disclosure have been described with emphasis, it should be understood that within the scope of the appended claims, the present invention can be practiced other than as specifically described herein. For instance, the invention may be practiced with a triply redundant feed system, or in the alternative, be practiced with more than three sub-streams, simply by duplicating the features of the feed lines or the sub-stream lines and their respective flowmeters and valves.

The invention claimed is:

1. A system for providing a chemical fluid to a plurality of chemical injection sites, the system comprising:
   a primary chemical feed conduit receiving the chemical fluid under a feed pressure from an upstream pump;
   wherein the upstream pump is a single upstream pump;
   a manifold dividing the primary chemical feed conduit into a plurality of sub-stream conduits;
   wherein each sub-stream conduit of the plurality of sub-stream conduits conveys the chemical fluid to each chemical injection site of the plurality of chemical injection sites under only the feed pressure from the single upstream pump;
   wherein each sub-stream conduit of the plurality of sub-stream conduits is fluidly isolated downstream from the manifold and is configured to pass the chemical fluid downstream from the manifold to each chemical injection site of the plurality of chemical injection sites; and
   wherein each sub-stream conduit of the plurality of sub-stream conduits comprises:
      a flow meter measuring a rate of chemical fluid flow through the respective sub-stream conduit and transmitting the rate to a control computer;
      a motorized flow control valve, adjusted by the control computer to open or close based on the difference between the rate, measured by the flow meter, and a programmed rate; and
      a discharge port conveying the chemical fluid at the programmed rate to the plurality of chemical injection sites.

2. The system of claim 1, further comprising a secondary chemical feed conduit receiving a second chemical fluid under the feed pressure from the upstream pump, wherein the primary chemical feed conduit and secondary chemical feed conduit merge upstream of a flexible joint.

3. The system of claim 2, wherein one of the primary chemical feed conduit and secondary chemical feed conduit provides redundant, uninterrupted chemical fluid flow to the plurality of sub-stream conduits when the other of the primary chemical feed conduit and secondary chemical feed conduit is interrupted.

4. The system of claim 1, wherein each sub-stream conduit of the plurality of sub-stream conduits further comprises an in-line check valve preventing backflow from the respective downstream chemical injection site.

5. The system of claim 1, further comprising a skid frame, having a first end and a second end, wherein the primary chemical feed conduit receives the chemical fluid at the first end of the skid frame and the plurality of sub-stream conduits discharge chemical fluid at the second end of the skid frame, and wherein the control computer is mounted to the skid frame.

6. The system of claim 1, further comprising:
a second motorized flow control valve and a second flow meter;
the second motorized flow control valve and the second flow meter attached to the primary chemical feed at a position upstream of a flexible joint;
wherein the second motorized flow control valve and the second flow meter are operatively connected to a second control computer to open or close the second motorized control valve based on the difference between a second measured rate, measured by the second flow meter, and a second programmed rate; and
wherein the flexible joint is positioned upstream the manifold.

* * * * *